United States Patent [19]
Bassler et al.

[11] Patent Number: 5,696,669
[45] Date of Patent: Dec. 9, 1997

[54] SHIELDING SYSTEM FOR PC CARDS

[75] Inventors: Maxwill P. Bassler, Hampshire; John E. Lopata, Naperville, both of Ill.

[73] Assignee: Molex Incorporated, Lisle, Ill.

[21] Appl. No.: 585,050

[22] Filed: Jan. 11, 1996

[51] Int. Cl.$^6$ .................................................. H05K 9/00
[52] U.S. Cl. .................... 361/816; 361/818; 361/736; 361/752; 439/607; 439/946; 174/35 R
[58] Field of Search .......................... 361/736, 748, 361/752, 753, 816, 818; 174/35 R; 439/76.1, 607, 946

[56] References Cited

U.S. PATENT DOCUMENTS

| | | | |
|---|---|---|---|
| 5,161,998 | 11/1992 | Defeibaugh et al. | 439/544 |
| 5,242,310 | 9/1993 | Leung | 439/76 |
| 5,244,397 | 9/1993 | Anhalt | 439/101 |
| 5,277,627 | 1/1994 | Matsuzaki | 439/677 |
| 5,330,360 | 7/1994 | Marsh et al. | 439/76 |
| 5,333,100 | 7/1994 | Anhalt et al. | 361/818 |
| 5,339,222 | 8/1994 | Simmons et al. | 361/818 |
| 5,386,340 | 1/1995 | Kurz | 361/737 |
| 5,409,385 | 4/1995 | Tan et al. | 439/76 |
| 5,413,490 | 5/1995 | Tan et al. | 439/76 |
| 5,425,646 | 6/1995 | Green | 439/79 |
| 5,480,326 | 1/1996 | Chen | 439/607 |
| 5,496,195 | 3/1996 | Reed | 439/607 |

FOREIGN PATENT DOCUMENTS

| | | | |
|---|---|---|---|
| 0 508 869 A2 | 4/1992 | European Pat. Off. | 361/818 |

*Primary Examiner*—Leo P. Picard
*Assistant Examiner*—Jayprakash N. Gandhi
*Attorney, Agent, or Firm*—Stacey E. Caldwell

[57] ABSTRACT

A pc card includes a generally rectangular frame and a circuit board assembly mounted on the frame. An unshielded connector is mounted on the frame at one end thereof. A pair of cover panels sandwich the circuit board assembly therebetween, leaving at least a mating face of the connector exposed exteriorly of the frame for interfacing with a complementary mating connector. At least one of the cover panels is conductive. A shield is coupled to the conductive cover panel, independent of the connector, for shielding the interface of the connector and the complementary mating connector.

18 Claims, 3 Drawing Sheets

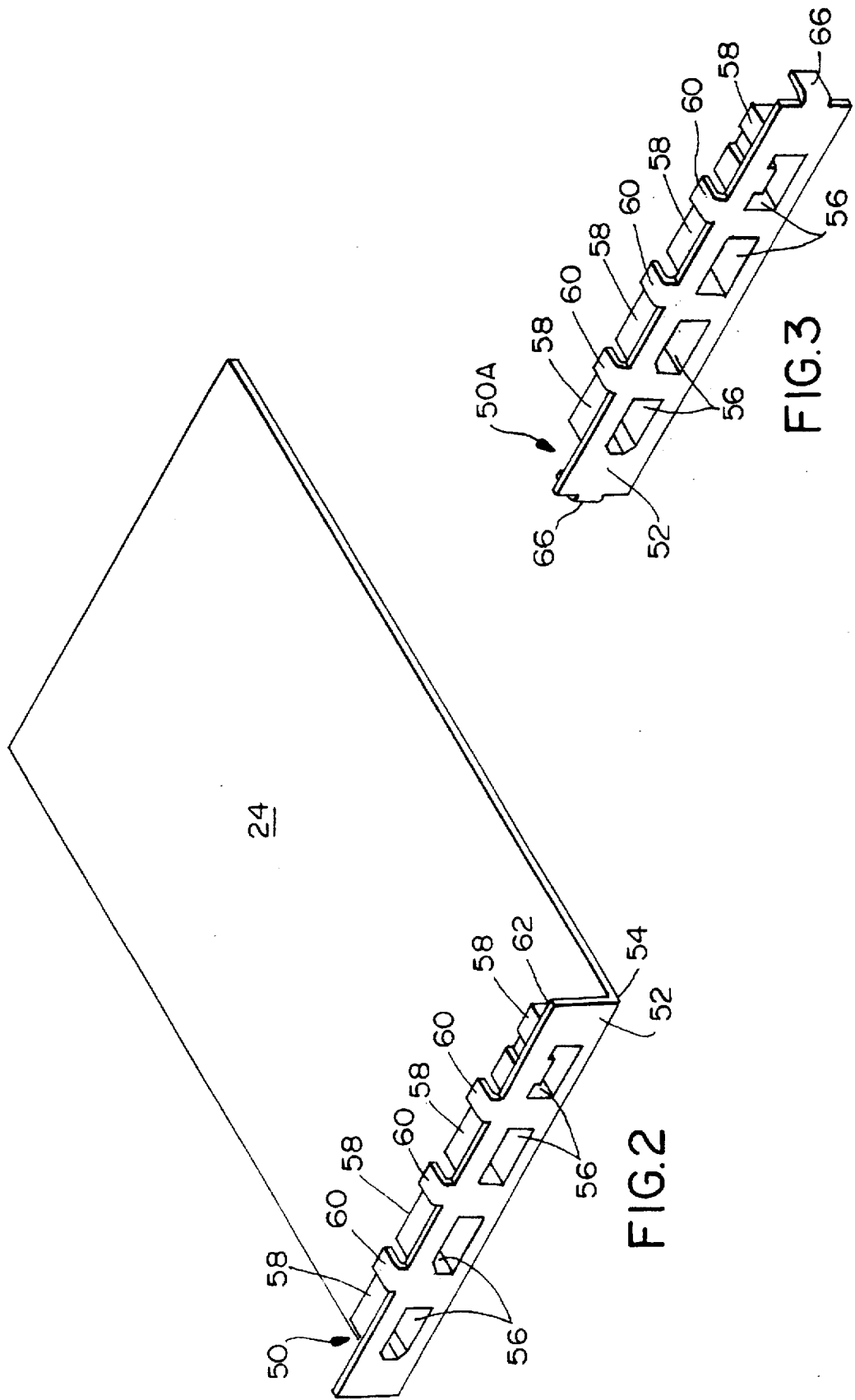

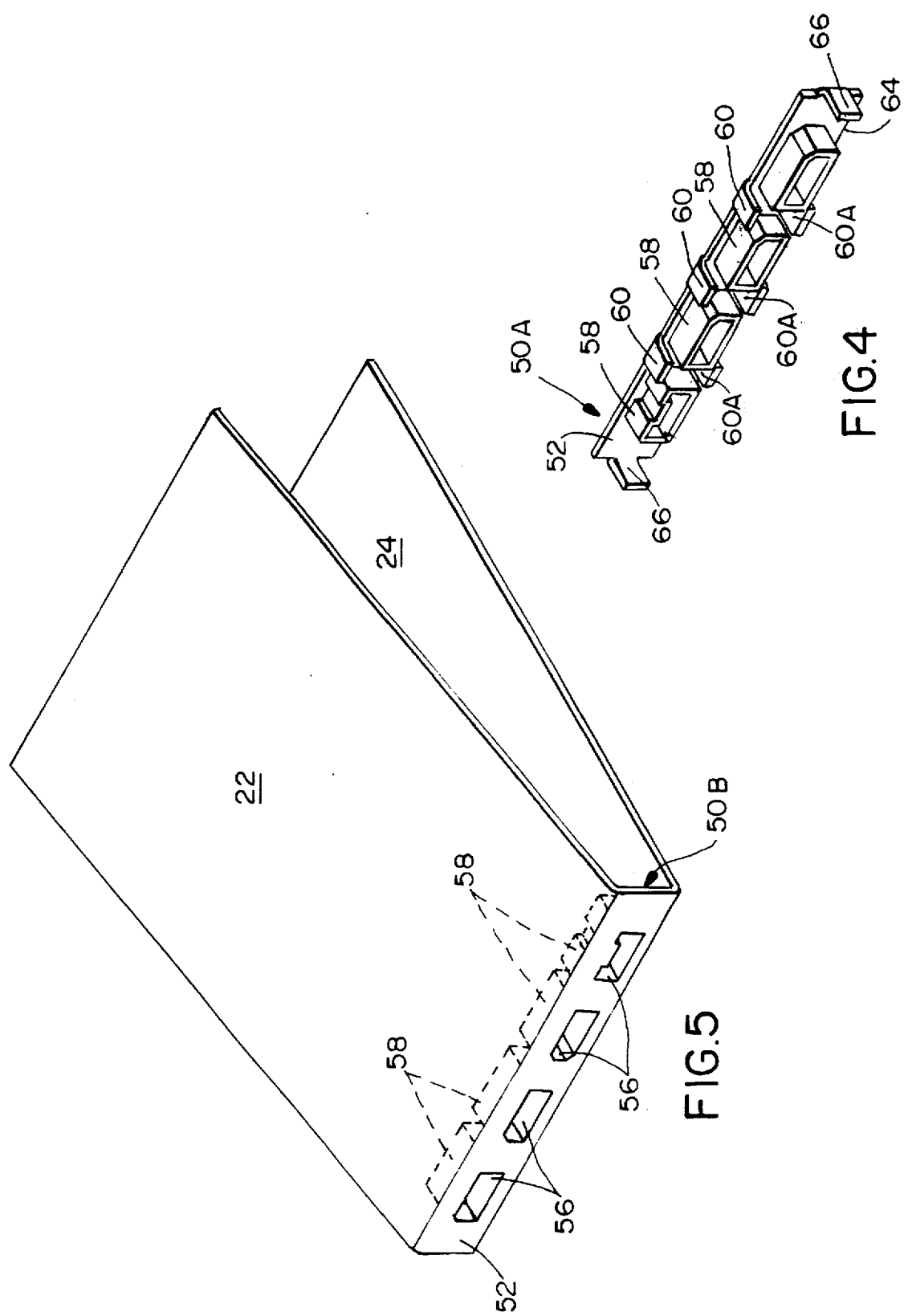

SHIELDING SYSTEM FOR PC CARDS

FIELD OF THE INVENTION

This invention generally relates to the art of shielding and, particularly, to a pc card and electrical connector assembly having an improved shielding system.

BACKGROUND OF THE INVENTION

Generally, pc cards, such as memory cards, are data input devices which are removably interconnected to an electronic apparatus such as a word processor, personal computer or other electronic apparatus. The data stored in the pc card is transferred to the electronic apparatus as needed. The cards are portable instruments which are readily inserted and extracted from a mating connector apparatus for removably coupling the pc card to a printed circuit board, for instance.

A pc card conventionally includes a frame which is generally rectangular and includes an opening in either a top surface or a bottom surface thereof or, in some constructions, in both surfaces. The opening receives a circuit board assembly, and a panel or cover closes the opening and encloses the circuit board assembly within the frame. Often, a pair of panels or covers sandwich the frame and the circuit board assembly therebetween. The cover panels may be of conductive material, such as sheet metal.

The circuit board assembly of a pc card conventionally includes a generally planar dielectric substrate with circuit traces and at least one electrical component mounted thereon. The electrical component(s) may include semiconductor devices, integrated circuits, batteries or the like.

A pc card also includes an electrical connector means, often called a receptacle connector, for mating the card to a computer or other device which will utilize the card's memory and/or perform computer operations on data which is stored in the pc card and/or received from the outside environment. The receptacle connector is provided at one end of the pc card.

Some pc or memory cards are generally denoted as an "input/output" or "I/O" card which connects the computer or other device to one or more of peripheral devices and systems such as fax machines, or printers or the like. I/O cards address the computer through I/O connectors positioned at the end of the pc card opposite the receptacle connector. In the high speed data transmission applications of many pc cards, it is necessary to shield the I/O connector interfaces to avoid radio frequency interference (RFI) and electromagnetic interference (EMI) caused by energy both inside and outside the system, thus "hardening" the system to the ingress and egress of radiated emissions.

Heretofore, in order to provide RFI and EMI protection, the I/O connectors at the end of the pc card typically have their own shields. The shields are stamped and formed of sheet metal material similar to the shields of other common shielded electrical connectors. Within the pc card system, the individual shields of the individual pc connectors then are grounded to an internal ground circuit on the internal circuit board assembly of the pc card. The internal ground circuit, in turn, is grounded to one or more of the cover panels of the pc card. Since pc cards are now being used for a variety of peripheral applications, more than one I/O connector may be required at the end of the pc card for simultaneous connection to the various peripheral equipment discussed above.

A problem with shielding individual I/O connectors by stamping, forming and assembling a discrete shield for each connector is that such procedures can be very expensive in terms of cost and labor, and can add tremendously to the overall cost of the card. Since the cover panels of the pc cards can be made of conductive shielding material, the present invention proposes to solve these problems by providing a shielding system which is integral or coupled directly to the conductive cover panels, thereby eliminating the need for discrete shields for each individual I/O connector.

SUMMARY OF THE INVENTION

An object, therefore, of the invention is to provide a new and improved shielding system for the connectors of a pc card.

In the exemplary embodiment of the invention, a pc card is disclosed to include a generally rectangular frame having a front insertion end and a rear I/O end. A circuit board assembly is mounted on the frame. A receptacle connector is provided at the front insertion end of the frame. I/O connector means are provided at the rear I/O end of the frame. A pair of conductive cover panels sandwich the circuit board assembly therebetween and leave at least a mating face of each of the receptacle connector and the I/O connector means exposed exteriorly of the frame. A shield is coupled to at least one of the conductive cover panels at the rear I/O end of the frame, independent of the I/O connector, for shielding the interface of the I/O connector and a complementary mating connector.

As disclosed herein, the shield is provided by a face plate at the rear I/O end of the frame. In one embodiment of the invention, the face plate is separate from but coupled directly to at least one of the conductive cover panels. In another embodiment, the face plate is formed integral with one of the conductive cover panels. In a further embodiment, the face plate is formed integral with both of the pair of conductive cover panels in a clam shell-type configuration.

The face plate includes at least one aperture for insertion therethrough of the complementary mating connector. The shield means is provided by a shroud integral with the face plate and projecting from the face plate around the aperture about the interface of the I/O connector and the complementary mating connector.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is a perspective view of the integral shield means and cover panel of FIG. 1;

FIG. 3 is a perspective view of a shield means according to a second embodiment of the invention, incorporating a face plate which is coupled directly to the cover panels;

FIG. 4 is a perspective view looking toward the opposite side of the face plate in FIG. 3; and FIG. 5 is a perspective view of a shield means according to a third embodiment of the invention, wherein the shield means is integral with both conductive cover panels in a clam shell-type configuration.

DETAILED DESCRIPTION OF THE PREFERRED EMBODIMENTS

Figure 1:
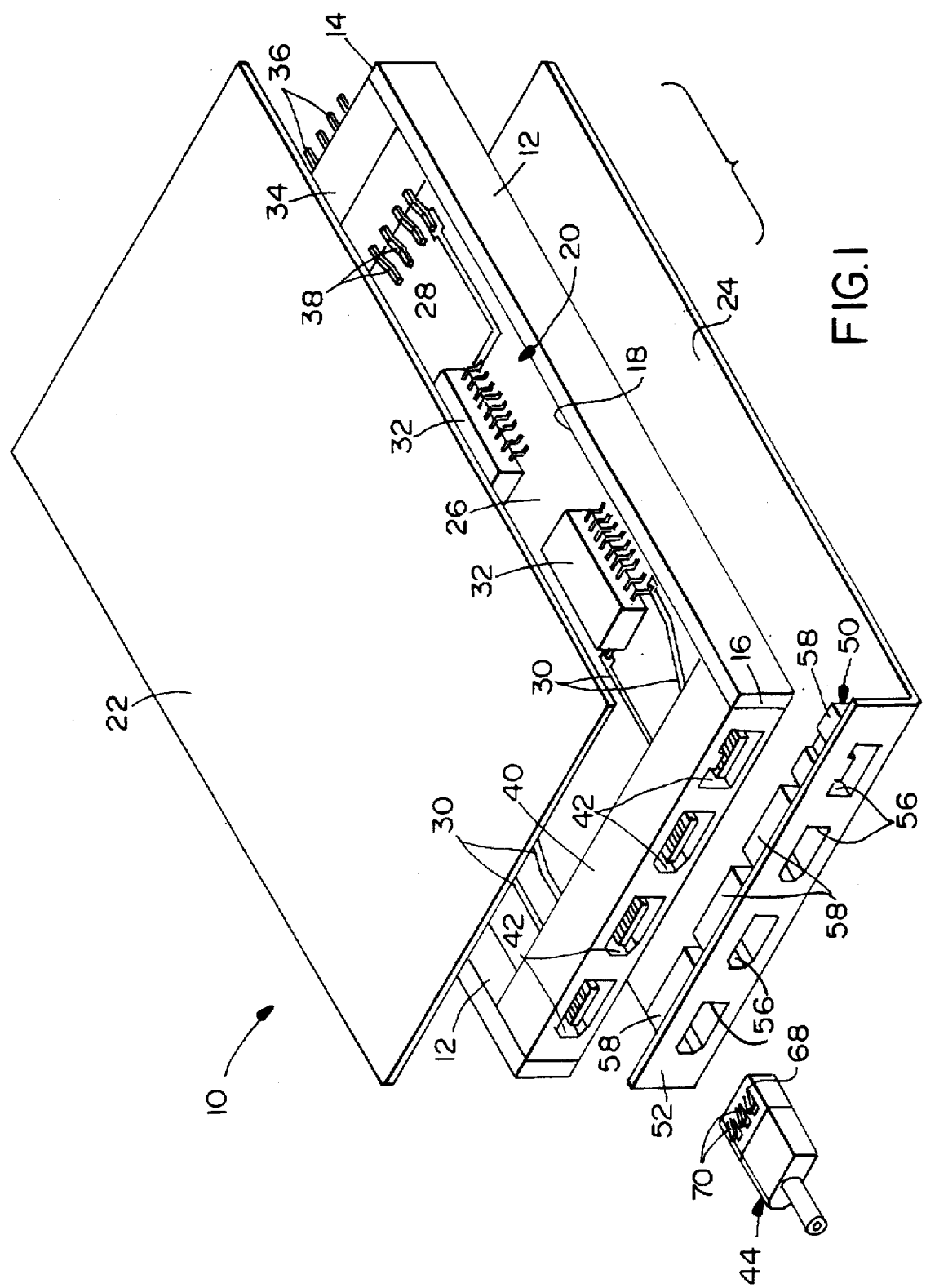
FIG. 1 is an exploded perspective view of a pc card embodying the concepts of the invention, wherein the shield means is integral with the bottom conductive cover panel.

Referring to the drawings in greater detail, and first to FIG. 1, the shielding system of the invention is embodied in a pc card, generally designated 10, which includes a generally rectangular frame 12 having a front insertion end 14 and a rear I/O end 16. The frame is open, at least at the top 18 thereof, and receives a circuit board assembly, generally designated 20. A pair of conductive cover panels, including a top cover panel 22 and a bottom cover panel 24, are secured to the frame and sandwich the circuit board assembly therebetween. The circuit board assembly includes a generally planar dielectric substrate 26 having circuit traces 28 and 30 and at least one electrical component 32 mounted thereon. The electrical component(s) may include semiconductor devices, integrated circuits, batteries or the like.

Still referring to FIG. 1, a typical pc card 10 includes a receptacle connector 34 at the front insertion end 14. The receptacle connector includes terminals having front mating portions 36 and rear tail portions 38. Receptacle connector 34, including front mating portions 36 of the terminals, is provided for mating the card to a computer or other device which will utilize the card's memory and/or perform computer operations on data which is stored in the pc card and/or received from the outside environment through I/O connector means described immediately below. The receptacle connector is electrically connected to circuit traces 28 by rear tail portions 38 of the terminals of the connector.

An I/O connector means 40 is mounted at rear I/O end 16 of the frame and includes a plurality of connective openings or slots 42 which define connector sockets. I/O connector means 40 includes a plurality of terminals (not shown) connected to circuit traces 30 on substrate 26 of circuit board assembly 20. Although a plurality of connector sockets 42 are formed in a singular I/O connector means 40 spanning the width of the pc card, it should be understood that a plurality of individual I/O connectors having their own separate connector sockets could be provided at I/O end 14 of the pc card, rather than the singular receptacle connector means 40. Regardless, one or more complementary mating plug connectors, generally designated 44, is insertable into connector sockets 42 for mating with the terminals therein regardless of whether a single connector is provided or a plurality of individual I/O connectors are provided. The I/O connector means 40 at I/O end 16 of the pc card is provided for interfacing data between an outside environment, such as a computer-related peripheral device (not shown) and circuit board assembly 20.

As stated in the "Background", above, heretofore, prior art pc cards utilized I/O connectors or connector means which were provided with their own individual shields to provide RFI and EMI protection. The individual shields typically have been stamped and formed of sheet metal material and assembled to the I/O connectors prior to assembling the I/O connectors in the pc card. This requires separate stamping, forming and assembly steps which can be costly in terms of cost and labor.

Referring to FIG. 2 in conjunction with FIG. 1, the invention is embodied in a shield, generally designated 50, which is coupled to at least one of the conductive cover panels 22 and/or 24 at rear I/O end 26 of the pc card. Shield 50 is independent of I/O connector means 40. Therefore, the I/O connector means can be fabricated without a shield and assembled in the pc card, eliminating the preassembly steps for the shields of the prior art I/O connectors. Yet, shield 50 is effective for shielding the interface of I/O connector means 40 and the complementary mating plug connector or connectors 44.

More particularly, shield 50 includes a face plate 52 which is formed integrally with bottom cover panel 24, along a front edge 54 of the panel. A plurality of apertures 56 are formed in the face plate. These apertures are alignable with and are of the same size and shape as connector sockets 42 in I/O connector means 40. It can be seen that the individual apertures may vary in configuration for keying purposes to ensure that the proper mating plug connector 44 is inserted into the correct aperture. A plurality of shielding shrouds or projections 58 are formed integrally with face plate 52 and extend rearwardly thereof generally parallel to the cover panels. These shrouds are insertable into connector sockets 42 to completely surround the terminal interfaces between I/O connector means 40 and complementary mating plug connectors 42, thereby providing an excellent shielding function or RFI and EMI protection for the interfaces. Again, shrouds 58 may be of different cross-sectional configurations corresponding to the different configurations of apertures 56 and connector sockets 42, such as for keying purposes, for example. Lastly, rearwardly projecting tabs 60 are formed at a top edge 62 of face plate 52. These tabs are effective to directly couple the face plate and shielding shrouds 58 to top conductive cover panel 22. Therefore, shield 50 is coupled directly to both conductive cover panels 22 and 24, while face plate 52 is integral with only the bottom conductive cover panel.

In manufacture, face plate 52 and rearwardly projecting tabs 60 are stamped and formed fabrication of bottom conductive cover panel 24. During the same processing step or steps, shrouds 58 can be drawn from the same integral metal material. This singular process is considerably less expensive than forming individual shields for the individual I/O connectors or connector means at the I/O end 16 of the pc card.

It should be understood that, while the concepts of the invention have been described above in relation to shielding the I/O connector means 40 at the rear I/O end of the pc card, the same concepts could be applied in the event that the front receptacle connector 34 has to be shielded. A front shield can be formed integral with or coupled directly to one or more of the conductive cover panels to shield the connecting interface at the insertion end of the pc card.

FIGS. 3 and 4 show a second embodiment of the invention, wherein a shield, generally designated 50A, is formed independently of either of the cover panels. Shield 50A is substantially identical to shield means 50, in that shield means 50A includes a face plate 52 having a plurality of apertures 56 formed therein, with corresponding rearwardly projecting shrouds 58 formed about the apertures. Again, tabs 60 directly couple shield 50A to top conductive cover panel 22. However, rather than forming shield 50A integral with bottom conductive cover panel 64, additional tabs 60A are formed along a bottom edge 64 of face plate 52, as best seen in FIG. 4. The bottom tabs are effective to couple face plate 52, along with shrouds 58, directly to bottom conductive cover panel 24. Side tabs 66 may be provided for mounting the face plate onto frame 12, as by appropriate adhesives, interengaging latches, or the like. Again, shield 50A in FIGS. 3 and 4 provides a shielding function for the connecting interfaces of I/O connector means 40 and eliminates the forming of separate shields for each I/O connector.

FIG. 5 shows a third embodiment of a shield, generally designated 50B, which is formed integrally with both conductive cover panels 20 and 24 in a clam shell-type configuration. As with shields mean 50 and 50A, shield 50B includes a face plate 52 having a plurality of apertures 42 formed therein, with respective shielding shrouds or projections 58 surrounding the apertures and projecting rearwardly of the face plate. The shielding shrouds 58, again, are effective to surround and shield the terminal connecting interfaces between complementary mating plug connectors 44 and I/O connector means 40 within connector sockets 42.

Lastly, referring back to FIG. 1, complementary mating connector 44 has its own shield 68 having integrally formed fingers 70 which are cantilevered in a flexible fashion projecting outwardly from the connector. These fingers, fabricated from the conductive material of the shield, engage within shrouds 58 to common the shield of the mating connector with shield 50, 50A or 50B. The shield of the card, in turn, is integral with and/or coupled directly to one or more of the conductive cover panels 22 and/or 24. In many pc cards, the cover panels are grounded to a ground circuit on circuit board assembly 20 which, through ground terminals in receptacle connector 34, or through the card-receiving connector of the underlying electronic apparatus, are grounded to the apparatus. Therefore, shield 50, 50A or 50B of the invention is effective in the commoning chain to ground the outside environment represented by mating plug connector 44 with the internal electronic device which receives the pc card.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A pc card, comprising:
   a circuit board assembly;
   a receptacle connector mounted to one end of the circuit board assembly and defining a front insertion end of the pc card;
   I/O connector means mounted to another end of the circuit board assembly and defining a rear I/O end of the pc card;
   a pair of conductive cover panels sandwiching the circuit board assembly therebetween with a mating face of each of the receptacle connector and the I/O connector means exposed; and
   a shield coupled to at least one of the conductive cover panels at the rear I/O end of the pc card including an aperture with a shroud therearound for surrounding and shielding the interface of the I/O connector means and a complementary mating connector means.

2. The pc card of claim 1 wherein said shield is integrally formed with at least one of the conductive cover panels.

3. The pc card of claim 1 wherein said shield is integrally formed with both conductive cover panels in a clam shell-type configuration.

4. The pc card of claim 1 wherein said shield comprises a discrete face plate electrically coupled to both conductive cover panels at the rear I/O end of the card.

5. The pc card of claim 1 wherein said shroud comprises a projection extending from the aperture toward the front insertion end of the card wherein the shroud completely surrounds the interface between the I/O connector means and the complementary mating connector means.

6. The pc card of claim 1 wherein said I/O connector means comprises a plurality of I/O connectors and the shield comprises a plurality of apertures each with a corresponding shroud therearound to surround and shield each of the I/O connectors such that each of the interfaces between the I/O connector and a complementary connector is shielded.

7. The pc card of claim 6 wherein each of said plurality of apertures varies in configuration from the others of the plurality of apertures to ensure that a proper complementary mating connector is inserted into a corresponding aperture.

8. A connector shield for a pc card, the pc card including a circuit board assembly, a connector mounted at one end of the circuit board assembly, and a pair of conductive cover panels sandwiching the circuit board assembly therebetween leaving a mating face of the connector exposed for interfacing with a complementary mating connector, comprising:
   an aperture with a shroud formed therearound, the shroud extending away from the aperture and generally surrounding the interface of the connector and the complementary mating connector to provide EMI and RFI protection therefore,
   wherein the shield is independent of the connector and is coupled to the conductive cover panels.

9. The shield of claim 8 wherein said shield is integrally formed with one of the conductive cover panels.

10. The shield of claim 8 wherein said shield comprises a discrete face plate coupled to the conductive cover panels at said one end of the circuit board assembly.

11. The shield of claim 8 wherein said shield is integral with both cover panels in a clam shell-type configuration.

12. A shield for a pc card, the pc card including a generally rectangular frame having a front insertion end and a rear I/O end, a circuit board assembly mounted on the frame, receptacle connector means at the front insertion end of the frame, I/O connector means at the rear I/O end of the frame, and a pair of conductive cover panels for sandwiching the circuit board assembly therebetween and providing shielding therefor wherein a mating face of each of the receptacle connector means and the I/O connector means is exposed for mating with complementary connector means, said shield comprising:
   a plate coupled to the conductive cover panels at the rear I/O end of the frame, an aperture in the plate for insertion therethrough of the complementary connector means, and a shroud projecting from the aperture, generally perpendicularly to the plate, and substantially surrounding the interface of the I/O connector means and the complementary connector means to provide RFI and EMI protection therefore.

13. A pc card, comprising:
   a generally rectangular frame having a front insertion end and a rear I/O end;
   a circuit board assembly mounted on the frame;
   receptacle connector means at the front insertion end of the frame;
   I/O connector means at the rear I/O end of the frame;

a pair of conductive cover panels sandwiching the circuit board assembly therebetween and providing shielding therefore wherein a mating face of each of the receptacle connector means and the I/O connector means is exposed for mating with complementary connector means; and a shield coupled to at least one of the conductive cover panels at the rear I/O end of the frame, an aperture in the shield for insertion therethrough of the complementary connector means, and a shroud projecting from the aperture substantially surrounding the I/O connector means to provide RFI and EMI protection for the interface of the I/O connector means and complementary means.

14. The pc card of claim 13 wherein said shield is integrally formed with at least one of the conductive cover panels.

15. The pc card of claim 13 wherein said shield is integrally formed with both conductive cover panels in a clam shell-type configuration.

16. The pc card of claim 13 wherein said shield comprises a discrete face plate electrically coupled to both conductive cover panels at the rear I/O end of the card.

17. The pc card of claim 13 wherein said I/O connector means comprises a plurality of I/O connectors and the shield comprises a plurality of apertures each with a shroud therearound to surround and shield each of the I/O connectors.

18. The pc card of claim 17 wherein each of said plurality of apertures varies in configuration from the others of the plurality to ensure that a similarly-configured complementary mating connector is inserted into the proper aperture.

* * * * *